United States Patent Office 2,802,459
Patented Aug. 13, 1957

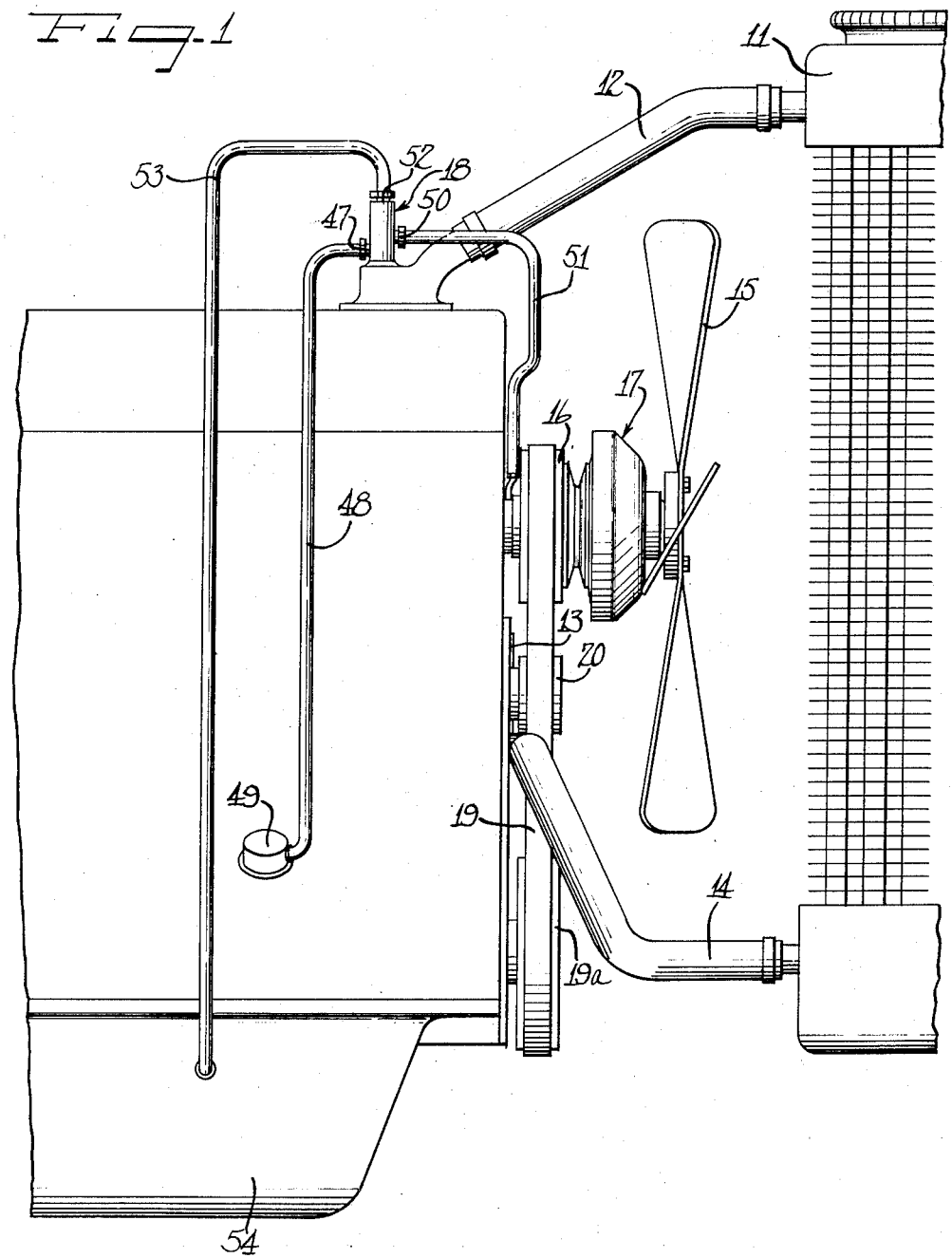

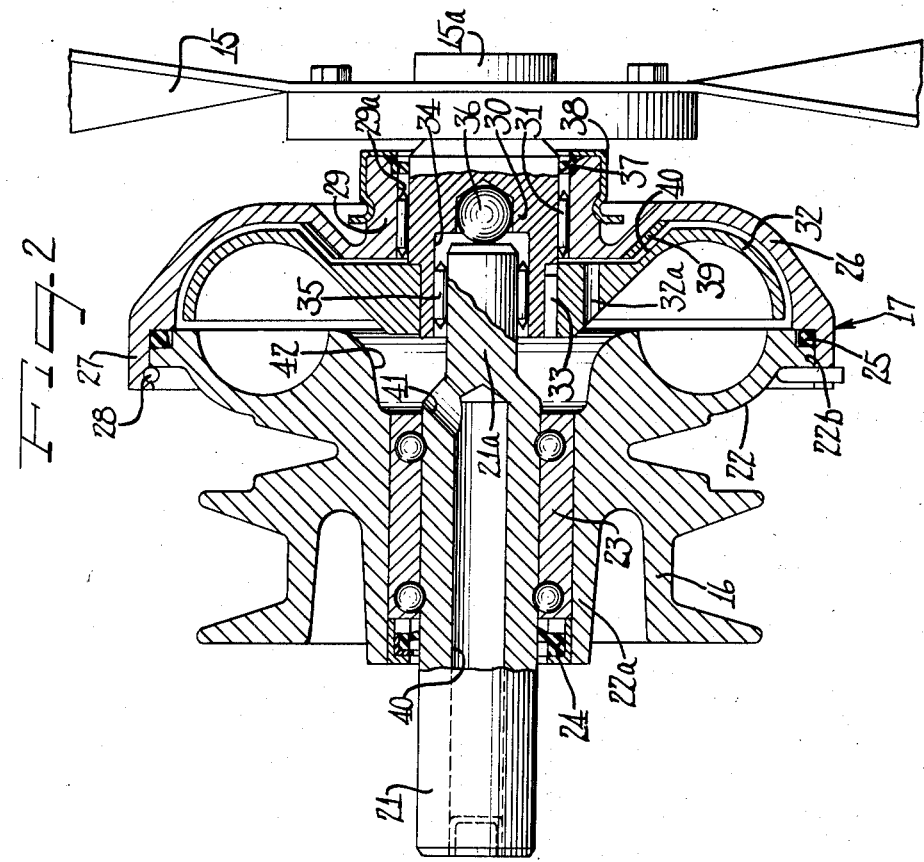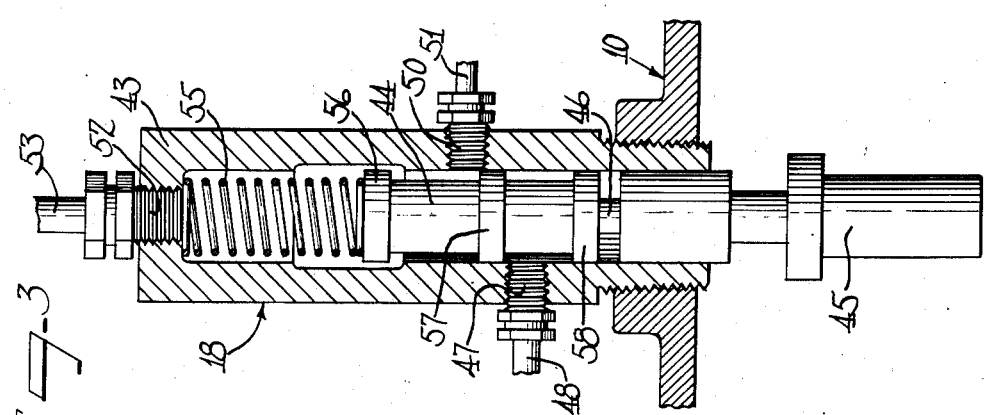
Edward J. Herbenar

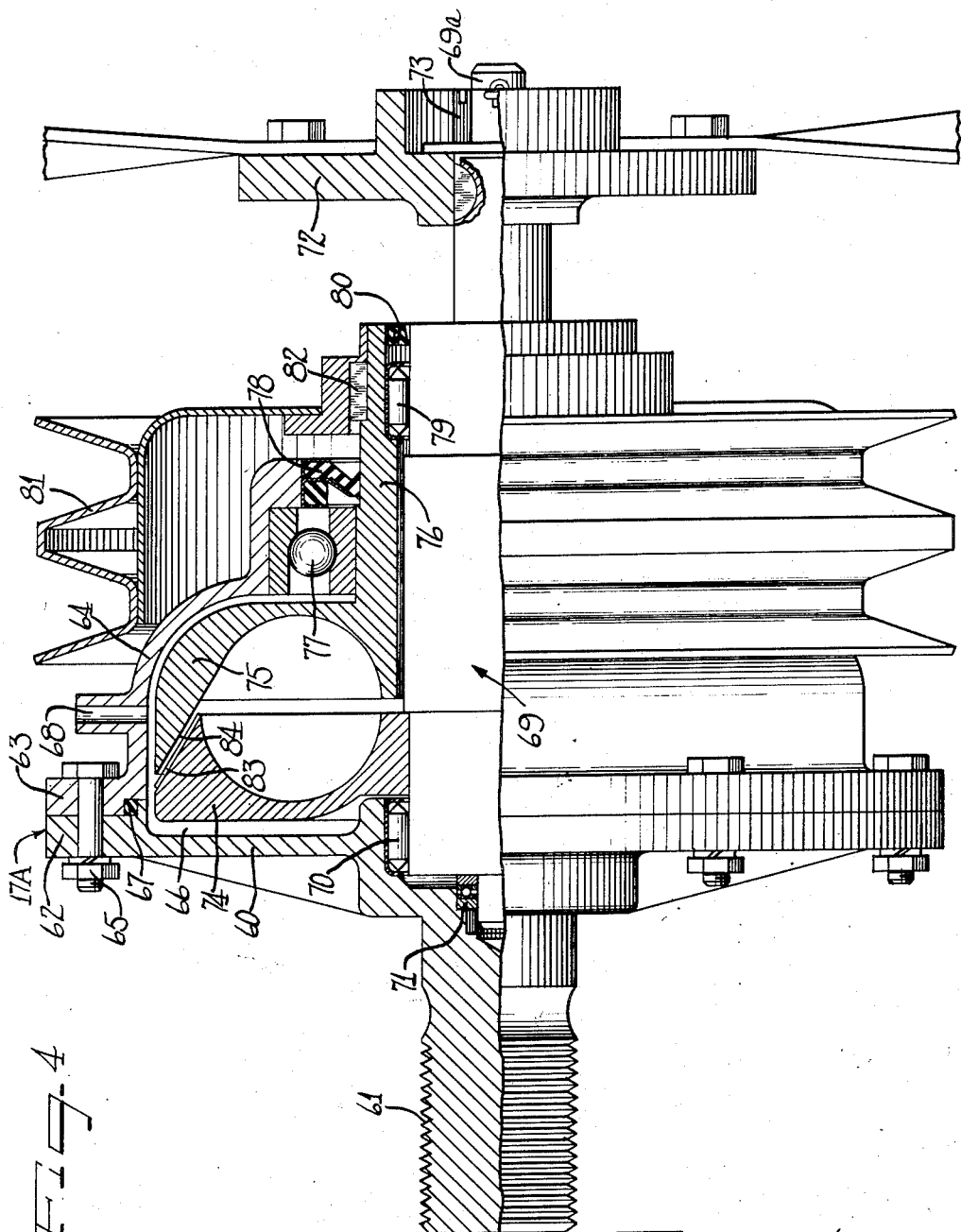

2,802,459

FAN DRIVE WITH A FLUID AND MECHANICAL COUPLING

Edward J. Herbenar, Detroit, Mich., assignor to Thompson Products, Inc., Cleveland, Ohio, a corporation of Ohio Application December 30, 1955, Serial No. 556,509

14 Claims. (Cl. 123—41.12)

This invention relates to improvements in fan drives, and more particularly to cooling fan drives of internal combustion engines or the like which delivers torque through the combined use of both a fluid coupling and a wet friction clutch, although the invention may have other uses and purposes as will be apparent to one skilled in the art.

In general, the invention deals with a fan drive for installation on an engine having a liquid cooling system and a pressurized oil lubrication system including, a fluid coupling having an impeller and a rotor and a wet friction clutch operable by relative axial movement between the impeller and rotor, a continuously driven pulley connected to the impeller, a fan connected to the rotor, a control valve associated with the oil system of the engine for controlling the fluid load on the fluid coupling, and a thermostatic element associated with the liquid cooling system of the engine for actuating the control valve. The control valve responds to the variations in engine temperatures to increase or decrease the fluid load on the fluid coupling, and thereby increase or decrease the speed of the impeller and fan. When the fluid load on the coupling reaches a predetermined amount, the wet friction clutch is energized thereby providing a fluid and mechanical connection between the fan and pulley. Actually, the impeller and rotor of the fluid coupling will be locked together by actuation of the wet friction clutch. This action gives the effect of a direct mechanical connection between the fan and pulley.

It is then an object of this invention to provide an improved fan drive unit of simple and economical construction which may be readily adapted for cooling usage on an internal combustion engine or other apparatus equipped with a liquid cooling system and a pressurized oil lubrication system.

A further object of this invention is in the provision of a fan drive unit capable of driving a fan at various speeds and capable of being automatically controlled by the cooling system of the engine.

A still further object of this invention resides in the provision of a cooling fan drive for use in connection with internal combustion engines or the like which delivers torque through the combined use of both a fluid coupling and a wet friction clutch.

A still further object of this invention is to provide a fan drive unit capable of driving a fan at various speeds that is self lubricating, of small size, and constructed of a minimum of wearing parts.

A still further object of this invention resides in the provision of an automotive cooling fan drive which delivers torque through the combined use of both a fluid coupling and a wet friction clutch which utilizes engine oil pressure for control, provides smooth and quiet engagement and disengagement of the elements, and is capable of delivering maximum efficiency.

A further object of this invention is to provide a device for effecting a fluid and mechanical connection between a driving member and a driven member including a fluid coupling having an impeller connecting to the driving member and a rotor connected to the driven member, wherein the impeller and rotor are mounted for relative axial movement therebetween and are provided with clutching faces for effecting a mechanical connection between the driving member and the driven member.

Other objects, features, and advantages of the invention will be apparent from the following detailed description of the accompanying sheets of drawings, wherein like reference numerals refer to like parts, in which:

On the drawings:

Figure 1 is a fragmentary side elevational view of an engine equipped with a fan drive unit constructed in accordance with the principles of the present invention;

Figure 2 is an enlarged sectional view, partially fragmentary, of the fan drive unit shown in Figure 1;

Figure 3 is an enlarged sectional view, partially fragmentary, of the fluid and mechanical coupling unit control valve according to the invention; and Figure 4 is an enlarged partial sectional view of a modified fluid and mechanical coupling unit according to the invention with some parts in elevation and other parts broken away.

As shown on the drawings:

Referring generally to Figure 1, the fan drive unit or assembly of the present invention is illustrated as installed on a liquid cooled internal combustion engine generally indicated by the numeral 10, including a radiator 11, connected at its inlet to the engine head by a flexible hose 12 and to a coolant pump 13 at its lower discharge end through a flexible hose 14.

The fan drive unit or assembly, in general, includes a fan 15, a continuously driven pulley 16, a fluid and mechanical coupling unit for connecting the fan 15 to the pulley 16, generally indicated by the numeral 17, and a thermostatically actuated fluid control, generally indicated by the numeral 18. An engine drive pulley 19a is mounted on an extension of the engine crank shaft projecting from the front of the engine and continuously drives the pulley 16 at substantially engine speed through the medium of V-belt 19. The belt 19 is also trained around the pulley 20 for driving the coolant pump 13.

Referring now to Figure 2, the coupling unit 17 includes a shaft 21 having an outer diametrically reduced end portion 21a. This shaft is fixedly carried at the front end of the engine 10 in a suitable manner as shown in Figure 1. An impeller 22 carries a rearwardly extending hub portion 22a that is centrally bored to receive in press fit relationship a bearing assembly 23, the latter being in anti-friction relationship on the shaft 21. Also integrally formed on the impeller hub 22a is the drive pulley 16 so that the impeller and drive pulley corotate. To prevent leakage of fluid from the impeller along the shaft 21, a seal or gasket structure 24 sealingly engages the shaft 21 and the bore of hub 22a.

The outer periphery of the impeller 22 is flanged at 22b and notched to receive an O-ring gasket 25 which engages an annular recessed portion of a housing member 26. The recess is formed by a counterbored cylindrical flange 27 which overlies the impeller flange 22b and projects to the rear thereof. An annular groove is formed near the end of the cylindrical flange 27 to receive a conventional split locking ring 28 for holding the housing and impeller tightly together in sealed relationship. The housing 26 defines a fluid working chamber with the impeller 22.

Protruding from the front of the housing 26 is an axial hub portion 29 having a central bore 29a therein which coaligns with the bore in the hub portion 22a of the impeller 22. This bore rotatably and slidably supports a stub shaft 30 by a needle bearing assembly 31. The outer end of the stub shaft 30 is diametrically reduced to be received in press fitted relationship with the hub 15a of the fan, while the inner end projects within the fluid working chamber and is slightly diametrically reduced to receive the hub portion of a rotor 32 which is in opposed relationship to the impeller 22. A key and keyway arrangement 33 connects the rotor and stub shaft for corotation. For additionally supporting and coaligning the stub shaft 30 with respect to the stationary shaft 21, a counterbore 34 is provided at the inner end of the stub shaft to telescopically receive therein the diametrically reduced end 21a of the shaft 21. A needle bearing assembly 35 assures the shafts of anti-friction relationship. The inner end of the bore 34 is recessed to receive a ball type thrust bearing 36 which revolubly engages the very end of the shaft 21 to limit the inward axial movement of the fan and rotor. It may be noted that the fan shaft 30 and the rotor 32 have rolling and sliding contact with the shaft end 21a and the housing bore 29a, thereby permitting a limited axial movement of the fan and rotor.

To ease the movement of the fluid from the mating face of the rotor 32 to the back face thereof and for reaching and lubricating the needle bearing assembly 31, an axial passage 32a is provided in the hub of the rotor. At the outboard end of the needle bearing assembly 31 and between the bore 29a and the shaft 30, a ring-shaped flexible seal 37 is provided and held in place by a somewhat cup-shaped retainer 38 snapped over the housing hub 29.

The impeller and rotor are provided with a plurality of equally spaced radial vanes encased in a more or less toroidal shell and the vanes may be inclined at 45° into the direction of rotation or be perpendicular to the shell. A conical clutch face 39 is formed within the working chamber on the housing 26 to coact with a conical clutch face 40 on the rotor 32. The clutch faces are engageable since the rotor is capable of axially moving relative to the impeller.

A fluid inlet is provided to the impeller and rotor through an axial bore 40 in the shaft 21 which communicates with the fluid working chamber through a plurality of angular passageways 41 at the inner end thereof. The fluid immediately enters an annular shaped chamber 42 before it is dispersed between the impeller and rotor.

In controlling the fluid flow to the coupling unit 17, the control valve 18 (seen most clearly in Figure 3) is provided with a cylindrical casing 43 that is axially bored to slidably receive a spool 44. A thermostatic element 45 slidably actuates the spool 44 within the casing 43 through the medium of a plunger 46. The lower end of the casing 43 is tapered and threaded to be received in sealing engagement by a tapered tap of the engine 10 in an area where the liquid coolant passes to return to the radiator 11. To relatively position the thermostatic element with the valve casing, an enlarged cylindrical portion of the element is received in press fit relationship at the lower end of the casing, thus, allowing the thermostat to extend into the coolant passage of the engine.

The thermostatic element is sold under the trade name "Vernatherm" and is of the general type as shown and described in the Vernet Patent No. 2,368,181, issued January 30, 1945, and it is also commonly known as a "Vernay" thermostatic element. The particular utility of this type of thermostatic element is in the positive action of the piston having far more power than any other thermostatic element and a relatively long piston travel, together with a compact overall size of the element in comparison with other known thermostatic units. Since the vernatherm is such a positive acting and powerful type of thermostatic unit, it is particularly desirable for use in conjunction with the present invention although other thermostatic units may be employed. In a main casing of the thermostatic unit 45, there is employed a thermally expansible material of the type such as shown and described in Patent No. 2,259,846, which issued to Sergius Vernat on October 21, 1941. The thermally expansible material is contained in the casing whereas the thermostatic element acts against a membrane or deformable member (not shown) as it expands to extend the piston of the vernatherm upon predetermined rises in temperature and thereby axially protract the spool 44.

Referring now also to Figure 1, in the side wall of the valve casing 37, an inlet 47 connects to a pressure line 48, which, in turn, is connected to an engine oil pressure source 49, such as the oil pump or engine oil pressure line of the engine. Also provided in the valve casing 37 opposite from the inlet 47 and at a slightly higher level is an outlet 50 which connects to a load and unload line 51 that leads to the inlet bore 40 of the coupling unit 17. At the top or head end of the valve casing 37, a return outlet 52 is provided and connected to an unload line 53, the latter being connected to a nonpressurized section of the lubrication system of the engine, such as the crank case 54.

The spool 44 is constantly urged to the position shown in Figure 3 by a helical spring 55. A plurality of lands or enlarged portions 56, 57 and 58 are carried on the spool which snugly engage the inner bore portion of the valve casing to define annular chambers or passageways therewith.

In operation of the fan drive assembly, when the engine coolant temperature is below a predetermined figure, the control valve will remain in the position as shown in Figure 3, wherein the pressure line 48 is closed to the fluid coupling 17 by virtue of the land 57 being positioned between the inlet 47 and the outlet 50, thereby communicating the fluid working chamber in the coupling unit 17 with the crank case 54 through the inlet-outlet bore 40, the load and unload line 51, the outlet 50 of the valve upwardly and around the top land 56 to the return outlet 52, and the load and return line 53.

As the temperature of the coolant in the engine gradually rises, the thermostatic element 45 is energized to protract the plunger 46 and the spool 44 against the action of the spring 55 and gradually allows communication between the oil pressure line 48 and the load and unload line 51 through the annular passage between the intermediate land 57 and the lower land 58. At the same time, the intermediate land 57 of the spool will close off the communication between the load and unload line 51 and the return or unload line 53. Depending on the temperature of the coolant, the actuation of the thermostat 45 and the axial movement of the spool 44 will result accordingly to vary the amount of communication between the oil pressure line 48 and the load and unload line 51 and vary the oil pressure load on the coupling unit 17 to ultimately vary the speed of the fan 15. When in the inoperative position, the coupling unit 17 is empty of fluid and the clutch faces are apart and held in such position by the frontal air blast of the moving vehicle against the fan 15. As the engine oil is allowed to enter the coupling, the impeller 22 will drive the rotor 32 and the fan 15. When the coupling unit 17 is filled with fluid, the fluid will assume the same pressure as the engine oil system. And due to the designed difference in surface area between the two sides of the rotor 32, the side of the rotor mating with the clutch 40 on the impeller being smaller in area than the side facing the impeller, the rotor 32 is forced to shift axially in the direction of the impeller clutch face 40 causing the clutch faces 39 and 40 to lock together and complete the drive hook-up for mechanical connection between the fan and pulley.

When the temperature of the coolant drops allowing the shifting of the spool 44 in the control valve 18, the coupling unit will unload due to the natural pumping action of the fluid coupling. The frontal air blast of the vehicle against the fan blades 15 separates the clutch faces 39 and 40 and axially shifts the rotor rearwardly until its travel is arrested by the thrust bearing 36 and is positioned as shown in Figure 2. It will be noted that when the fluid is in the coupling unit, it provides lubrication for the bearing 23, and the needle bearing assemblies 31 and 35, and the thrust bearing 36, thus, providing a self lubricated coupling unit. Moreover, when the fluid pressure within the coupling unit is such as to cause engagement of the impeller and rotor clutching faces, a direct drive is effected between the fan 15 and the drive pulley 16.

Referring now to Figure 4, a modified fluid and mechanical coupling unit 17A is shown including a housing having a back wall portion of disk-shape 60 with an axially rearwardly extending threaded stud 61 adapted to be secured to the engine 10 for mounting of the unit. The back wall 60 is peripherally flanged at 62 to mate with a similarly sized peripheral flanged 63 on a forwardly protruding bell-shaped housing section 64. A plurality of circumferentially spaced nut and bolt assemblies 65 extend through the flanges 62 and 63 to tightly hold the housing members 60 and 64 together. A somewhat cylindrically shaped fluid working chamber 66 is defined within the housing members and to prevent fluid from leaking between the flange faces, an O-ring gasket 67 is provided. Entry of fluid into the work chamber 66 is had through an inlet-outlet 68 which would, of course, be connected to the load and unload pressure line 51 in Figure 1.

An axially extending shaft 69 projects through the fluid working chamber 66 and through a central bore in the bored end of the housing member 64. A diametrically reduced portion of the shaft is bearingly supported within a recess in the back wall section 60 by a needle bearing assembly 70. A still further diametrically reduced shaft portion extends rearwardly to be received within a second recess in the housing back wall portion 60, and a thrust bearing 71 is received on this shaft portion to abut against the shoulder formed with the next diametrically larger shaft portion and against an annular shoulder formed in the back wall housing section 60. At the forward end of the shaft 69, a diametrically reduced portion receives a fan hub 72 in keyed relationship. Projecting forwardly from this shaft portion, a second diametrically reduced and threaded shaft portion 69a receives a castellated nut and washer assembly 73 to hold the fan hub 72 thereon.

Within the fluid working chamber 66, a rotor 74 is positioned and carried on the shaft 69 for corotation therewith. Oppositely facing the rotor 74 is an impeller 75 having a forwardly extending hub portion 76 centrally bored and in telescopic relationship with the shaft 69 to rotate free from interference therewith. A ball bearing assembly 77 is press fitted on the outer surface of the impeller hub 76 and within a counterbore formed at the forward end of the bell-shaped housing member 64 to bearingly support the impeller 75. An annular seal assembly 78 encircles the impeller hub 76 and engages the bore in the housing member 64 to prevent any leakage of fluid beyond the bearing assembly 77 and out of the housing member 64.

To further coalign the impeller hub 76 relative to the shaft 69, a needle bearing assembly 79 is positioned between the elements and near the forward ends thereof. Sufficient clearance is provided between the shaft 69 and the bore of the impeller hub 76 to allow fluid to reach the needle bearing assembly 79, but to prevent the fluid from leaving the coupling unit beyond the needle bearing assembly, a ring-shaped seal assembly 80 is provided which sealingly engages the impeller hub bore and the shaft 69 at their outer ends thereof. From this construction, it is seen that the shaft 69 and rotor 74 is in rotatably and axially slidable contact with the bearing assemblies. At the forward end of the impeller hub 76, the hub of a drive pulley 81 is received and secured thereto for corotation by a key and keyway arrangement 82. It may be noted that the pulley 81 is shown as a double pulley, but it is understood that a single mating pulley may be provided as shown in Figures 1 and 2. Conical mating clutch faces 83 and 84 are respectively provided at the outer peripheries of the rotor and impeller.

The operation of this coupling unit 17A is substantially identical with the operation of the coupling unit 17. As fluid initially enters the work chamber 66 through the inlet outlet 68, the impeller 75 begins to drive the rotor 74 and the shaft 69 which mounts the fan at the outer end thereof. When the pressure within the work chamber 66 reaches predetermined level, due to the designed difference between the face of the rotor 74 mating with the impeller 75 and the back side of the rotor and the shaft end portions, the pressure of the oil will cause the rotor 74 and shaft 69 to shift axially forward and matingly engage the cone-shaped clutch faces 83 and 84 to effect a mechanical connection between the stationary impeller and the movable rotor by a wet friction clutch arrangement. In other words, the fluid under pressure is free to filter along the back side of the rotor 74 and through both the end bore needle bearing assembly 70 and the thrust bearing 71 to thereby apply pressure to the entire projected area on the back side of the rotor and shaft which will force the rotor to move in the direction of the impeller 75.

When the fluid pressure is released, the normal pumping action of a fluid coupling will pump the fluid out of the coupling unit through the inlet-outlet 68, and the frontal air blast of the vehicle against the fan blades will force the shaft 69 and rotor rearwardly, thereby declutching the clutching faces 83 and 84. It will also be noted that fluid is allowed to filter around the front side of the impeller 75 to lubricate the bearing 77 and along the bore of the impeller hub 76 to lubricate the needle bearing assembly 79.

It will be understood that modifications and variations may be effected without departing from the scope of the novel concepts of the present invention, but it is understood that this application is to be limited only by the scope of the appended claims.

I claim as my invention:

1. In a cooling fan drive for an internal combustion engine, a shaft, a pulley continuously driven at engine speed rotatably mounted on said shaft, a fan rotatably mounted on said shaft, a fluid coupling between said pulley and said fan, a mechanical clutch between said pulley and said fan and means for sequentially energizing said fluid coupling and said clutch to initially provide a fluid coupling connection between said pulley and said fan and subsequently provide a positive connection therebetween.

2. A cooling fan coupling device comprising a driving member, a driven member connected to said fan, a fluid coupling connecting said members together and a mechanical clutch connecting said members together, and means for initially energizing said fluid coupling and subsequently engaging said mechanical clutch to drive said fan.

3. In a cooling fan drive for an internal combustion engine, a pulley continuously driven at engine speed, a fan, a combination fluid and mechanical coupling having an impeller connected to said pulley and a rotor connected to said fan, said impeller and rotor being axially movable relative to each other, and a friction clutch defined by the engagement of the impeller and rotor.

4. A coupling for selectively connecting a driving member to a driven member including a fluid coupling having an impeller connected to said driving member and a rotor connected to said driven member, and said rotor and impeller being mounted for relative axial movement therebetween and having friction engaging faces to mechanically connect the driving and driven members, whereby a fluid and a mechanical coupling is established upon introducing pressurized fluid to said fluid coupling.

5. In a coolant jacketed engine assembly having a cooling fan, a driving member for rotating said fan, a driven member connected to said fan, a fluid coupling connecting said members together, a mechanical clutch connecting said members together and means for initially energizing said fluid coupling and subsequently engaging said mechanical clutch to drive said fan, said last named means being responsive to an increase in the temperature of said coolant to a predetermined temperature to initiate operation of said coupling and clutch.

6. A cooling fan drive for a liquid cooled apparatus which comprises a continuously driven pulley, a cooling fan associated with said pulley but normally remaining stationary relative thereto, a combination fluid coupling and wet friction clutch unit selectively interconnecting said pulley and fan, and means sequentially energizing said fluid coupling and wet friction clutch to provide a final friction clutch drive between said pulley and said fan.

7. In a drive for internal combustion engines or the like having a cooling system and a pressurized oil lubrication system, a fan, a continuously driven pulley, a combination fluid and mechanical coupling unit including an impeller secured to said pulley, a rotor opposing said impeller and being connected to said fan, said rotor being axially movable relative to said impeller, opposed clutch faces on said impeller and rotor, a fluid connection between said coupling unit and said lubrication system, and means for controlling the deliverance of oil to said unit, whereby the impeller drives the rotor upon initial introduction of oil into said unit and axially shifts the rotor so that the clutch faces engage when the oil pressure reaches a predetermined level.

8. A combination fluid and mechanical coupling unit for use with cooling fan drive assemblies on internal combustion engines or the like which comprises an impeller adapted to be directly connected to a driving pulley, a housing secured to said impeller for corotation therewith and having an interiorly carried clutch face, a stationary shaft rotatably supporting said impeller and housing, and a rotor in said housing in opposed relation to said impeller and rotatably-slidably carried on said shaft, said rotor having a clutch face opposing said housing clutch face, whereby a fluid coupling is established by initial introduction of fluid into said unit and a mechanical coupling is established when the fluid pressure in said unit reaches a predetermined level and causes the clutch faces to engage.

9. A combination fluid and mechanical coupling unit for use with cooling fan drive assemblies on internal combustion engines or the like which comprises a housing carried on the engine having a fluid chamber therein, a shaft rotatably supported by said housing, said shaft extending through said fluid chamber and projecting from one end of said housing, a rotor in said chamber and being carried on said shaft for corotation therewith, said shaft and rotor being slidably mounted relative the housing, an impeller rotatably supported in said housing in opposed relation to said rotor, a driving pulley outside of said fluid chamber and connected to said impeller, and opposed clutch faces on said rotor and impeller, whereby a fluid coupling is established by initial introduction of fluid into said housing and a mechanical coupling is established when the fluid pressure in said unit reaches a predetermined level and causes the clutch faces to engage.

10. A combination fluid and mechanical coupling unit for use with cooling fan drive assemblies on internal combustion engines or the like which comprises an impeller adapted to be directly connected to a driving pulley, a housing secured to said impeller for corotation therewith and having an interiorly carried cone-shaped clutch face, a stationary shaft rotatably supporting said impeller and housing, and a rotor in said housing in opposed relation to said impeller and rotatably slidably carried on said shaft, said rotor having a cone-shaped clutch face opposing said housing clutch face, whereby a fluid coupling is established by initial introduction of fluid into said unit and a mechanical coupling is established when the fluid pressure in said unit reaches a predetermined level and causes the clutch faces to engage.

11. A combination fluid and mechanical coupling unit for use with cooling fan drive assemblies on internal combustion engines or the like which comprises a housing carried on the engine having a fluid chamber therein, a shaft rotatably supported by said housing, said shaft extending through said fluid chamber and projecting from one end of said housing, a rotor in said chamber and being carried on said shaft for corotation therewith, said shaft and rotor being slidably mounted relative the housing, an impeller rotatably supported in said housing in opposed relation to said rotor, a driving pulley outside of said fluid chamber and connected to said impeller, and cone-shaped clutch faces on said rotor and impeller whereby a fluid coupling is established by initial introduction of fluid into said housing and a mechanical coupling is established when the fluid pressure in said unit reaches a predetermined level and causes the clutch faces to engage.

12. In combination with an internal combustion engine or the like having a cooling system and a pressurized oil lubrication system, a cooling fan assembly including a fan, a continuous driven pulley, and a fluid and mechanical coupling unit for selectively connecting said fan and pulley comprising a stationary shaft projecting from the engine, an impeller rotatably supported on said shaft and connected for corotation with said drive pulley, a housing carried by said impeller and being secured thereto, a rotor in said housing in opposed relationship to said impeller and being connected to said fan, a fluid inlet to said housing, and opposed clutch faces on an interior surface of said housing and the rotor, wherein said rotor is capable of axially shifting from said impeller to cause engagement of said clutch faces.

13. A fan drive assembly adapted to be mounted on internal combustion engines or the like having a cooling system and a pressurized oil lubrication system including a fan, a continuously driven pulley, and a fluid and mechanical coupling unit selectively connecting said fan and pulley comprising a stationary shaft projecting from the front of the engine, an impeller secured to said pulley and rotatably supported on said shaft, a housing member sealingly secured to the outer peripheries of said impeller and defining a fluid work chamber, said shaft having a reduced end portion received within said work chamber, a rotor slidably and rotatably carried on said reduced shaft end portion in opposed relationship to said impeller, said rotor being secured to said fan for corotation therewith, a fluid connection to said work chamber for introducing therein pressurized oil from the lubrication system, means for controlling the oil flow to said work chamber, and opposed clutch faces on said housing and rotor, whereby the impeller drives the rotor upon initial introduction of oil into said work chamber and axially shifts the rotor so that the clutch faces engage when the oil pressure within the chamber reaches a predetermined level.

14. A fan drive assembly for internal combustion engines or the like having a cooling system and a pressurized oil lubrication system including a fan, a continuously driven pulley, and a fluid and mechanical coupling unit which comprises a housing secured to said engine and projecting from the front end thereof and defining a fluid working chamber therein, a fluid inlet to said housing, a shaft extending through said housing working chamber and projecting from the front end thereof, said shaft being rotatably and axially shiftably carried by said housing and having the fan mounted on the outer end thereof, a rotor in said working chamber and carried on said shaft for corotation therewith, an impeller in said working chamber in opposed relation to said rotor and having a hub portion encircling said shaft and projecting out of said housing to corotatably mount said pulley, opposed cone-shaped clutch faces on said rotor and impeller, and means for connecting said working chamber to said oil lubrication system and for controlling the oil supply to said chamber, whereby the impeller drives the rotor upon initial introduction of oil into said unit and axially shifts the rotor so that the clutch faces engage when the oil pressure reaches a predetermined level.

References Cited in the file of this patent

UNITED STATES PATENTS

| | | |
|---|---|---|
| 2,289,440 | Kugel | July 14, 1942 |
| 2,594,460 | Lauck | Aug. 29, 1952 |
| 2,661,148 | Englander | Dec. 1, 1953 |